(12) United States Patent
Volent

(10) Patent No.: US 10,208,563 B2
(45) Date of Patent: Feb. 19, 2019

(54) FLUID FLOW CONTROL VALVE

(71) Applicant: SUBSEA CHOKES INTERNATIONAL AS, Trondheim (NO)

(72) Inventor: Eirik Volent, Trondheim (NO)

(73) Assignee: SUBSEA CHOKES INTERNATIONAL AS, Trondheim (NO)

( * ) Notice: Subject to any disclaimer, the term of this patent is extended or adjusted under 35 U.S.C. 154(b) by 207 days.

(21) Appl. No.: 15/110,344

(22) PCT Filed: Jan. 20, 2015

(86) PCT No.: PCT/NO2015/050012
§ 371 (c)(1),
(2) Date: Jul. 7, 2016

(87) PCT Pub. No.: WO2015/115907
PCT Pub. Date: Aug. 6, 2015

(65) Prior Publication Data
US 2016/0333663 A1 Nov. 17, 2016

(30) Foreign Application Priority Data
Feb. 3, 2014 (NO) .................................... 20140119

(51) Int. Cl.
*F16K 1/38* (2006.01)
*E21B 34/06* (2006.01)
*E21B 34/00* (2006.01)
(Continued)

(52) U.S. Cl.
CPC .............. *E21B 34/06* (2013.01); *E21B 21/10* (2013.01); *E21B 34/00* (2013.01); *E21B 43/12* (2013.01);
(Continued)

(58) Field of Classification Search
CPC ..... F16K 1/12; F16K 1/34; F16K 1/36; F16K 1/38; F16K 1/385; F16K 1/42; E21B 34/00; E21B 34/06; E21B 21/10; E21B 43/12
(Continued)

(56) References Cited

U.S. PATENT DOCUMENTS 2,601,654 A 6/1952 Wright
3,110,320 A 11/1963 Rosenberger
(Continued)

FOREIGN PATENT DOCUMENTS

CA 2253637 A1 5/2000

OTHER PUBLICATIONS

International Search Report and Written Opinion in corresponding PCT Application No. PCT/NO2015/050012, dated Jun. 2, 2015.

*Primary Examiner* — Ian Paquette
(74) *Attorney, Agent, or Firm* — Leason Ellis LLP

(57) ABSTRACT

Fluid flow control valve, the valve comprising a valve housing (10) provided with a flow channel (12), which in direction from the inlet section to the outlet section, comprises a substantially conical inlet (13), a valve seat (14), and a diffuser (15) at the outlet section, which transfers into a flow channel (16). A needle-shaped spindle (11) is arranged axially movable within the flow channel (12) and exhibits a largest diameter $D_N$. The inlet (13) exhibits a first conical inlet section (13') having an angle $\alpha_1$ of 15° with the longitudinal axis of the flow channel (12), and a second inlet section (13") with a radius of curvature $R_2$ equal to 5.7 times the diameter $D_N$ of the spindle (11). The diffuser (15) is conical having an increasing cross-section in the flow direction by an angle $\alpha_2$ of 30° with the longitudinal axis in the flow channel (12). The design of the valve produces mini-
(Continued)

mum erosion at the inlet section, and minimum cavitation and erosion in the diffuser section (15).

10 Claims, 1 Drawing Sheet

(51) Int. Cl.
*E21B 43/12* (2006.01)
*E21B 21/10* (2006.01)
*F16K 25/04* (2006.01)
*F16K 1/42* (2006.01)

(52) U.S. Cl.
CPC ............... *F16K 1/38* (2013.01); *F16K 1/42* (2013.01); *F16K 25/04* (2013.01)

(58) Field of Classification Search
USPC .................................................. 251/122, 333
See application file for complete search history.

(56) References Cited

U.S. PATENT DOCUMENTS

| | | | | |
|---|---|---|---|---|
| 3,703,273 | A * | 11/1972 | Illing | ........................ F16K 1/38 |
| | | | | 138/46 |
| 4,732,364 | A * | 3/1988 | Seger | ........................ E21B 34/02 |
| | | | | 251/122 |
| 5,873,351 | A | 2/1999 | Vars et al. | |
| 6,250,602 | B1 | 6/2001 | Jansen | |
| 7,044,434 | B2 * | 5/2006 | Brinks | ........................ F16K 1/38 |
| | | | | 251/122 |
| 2003/0062495 | A1* | 4/2003 | Long | ........................ F16K 1/38 |
| | | | | 251/122 |
| 2013/0270473 | A1* | 10/2013 | Houis | ........................ B60T 8/3615 |
| | | | | 251/333 |

* cited by examiner

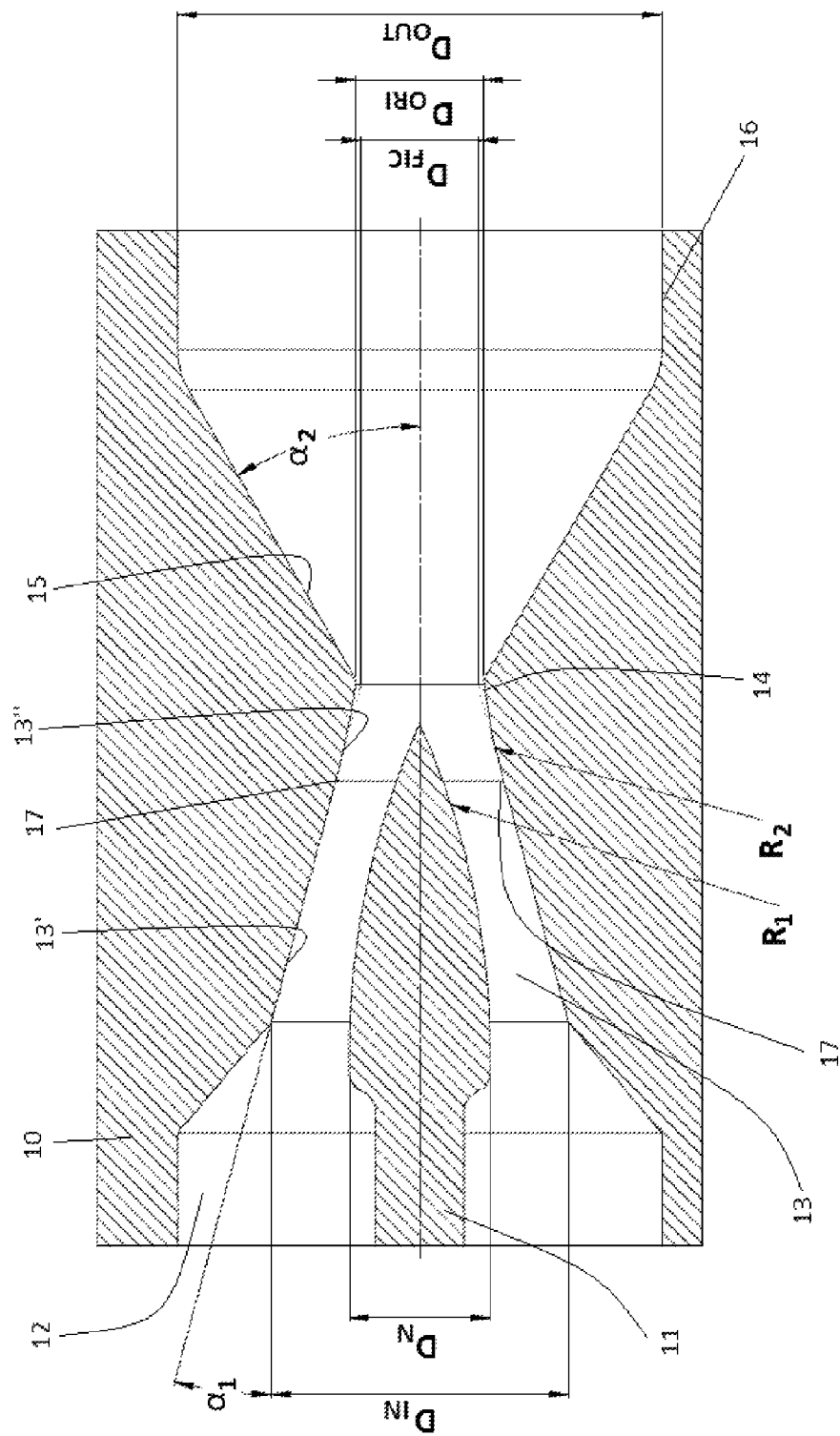

FLUID FLOW CONTROL VALVE

CROSS-REFERENCE TO RELATED PATENT APPLICATIONS

This application is a U.S. National Phase Application under 35 U.S.C. § 371 of International Patent Application No. PCT/NO2015/050012, filed Jan. 20, 2015, and claims the priority of NO 20140119, filed Feb. 3, 2014, all of which are incorporated by reference in their entireties. The International Application was published on Aug. 6, 2015 as International Publication No. WO 2015/115907 A1.

The present invention is related to a valve according to the preamble of claim 1, particularly a needle valve for controlling flow of oil and gas to specific flow rates.

BACKGROUND

Today there are numerous types of devices for flow control, such as for controlling oil and gas flow to specific flow rates. One valve type used for this purpose is needle valves. Needle valves are a valve type having a small flow orifice and a needle shaped stem allowing for an accurate flow control at relatively low flow rates. Other ranges of use are steam injectors and fuel injectors in combustion engines and gas turbines.

In a needle valve, a needle-shaped spindle is arranged, having a stroke direction axially in a flow channel, and is movable in relation to a conical seat. The outlet of the valve does typically exhibit a uniform flow cross section. A problem that arises in valves of this type, is erosion caused by particles and droplets hitting the seat surface at the inlet section. Another problem is erosion in the conical surface of the seat at the low-pressure side of the valve, because of turbulent flow. Moreover, these mechanical forces acting upon the valve may cause vibration in a valve and accompanying fittings, which in turn may shorten the lifetime of the fittings.

For applications in oil and gas installations offshore, where valves constitute a part of subsea structures, a valve breakdown is naturally very unfortunate, since a production shutdown itself is expensive. Moreover, exchange of valves in environments like this is time and cost consuming.

OBJECT

An object of the invention is to provide a valve that reduces the problem of erosion in the valve seat at the inlet section, caused by particles or droplets in the fluid. Another object is to provide a needle valve that decreases the problem of erosion in the valve seat at the outlet section. Another object of the invention is to provide a valve of this type that exhibits reduced vibration.

THE INVENTION

These objects are solved by a valve in accordance with the characterizing part of claim 1. Additional beneficial features appear from the dependent claims.

The present invention is related to a valve of the needle valve type, for flow control of a fluid, particularly fluid flows at offshore facilities, containing oil, gas, water and particles. The valve comprises a valve housing provided with a flow channel, which in direction from the inlet section towards the outlet section, comprises a substantially conical inlet at the inlet section, a valve seat, and a diffuser at the outlet section, which transfers into a flow channel having a substantially uniform flow cross-section. A substantially needle-shaped spindle is arranged axially movable in the flow channel, and exhibits a diameter at the end to be contacted by the valve seat, which is equal to or larger than the smallest flow cross-section in the valve seat 14.

In accordance with the invention, the inlet exhibits an inlet diameter and comprises a first conical inlet section having an angle with the longitudinal axis of the flow channel of 10-30°, and further a second inlet section, which is curved by a radius of curvature within the range of 4.7-6.7 times the diameter of the spindle. The radius of curvature of the spindle towards the apex is substantially equal to the radius of curvature of the second inlet section, and is also varying within the range of 4.7-6.7 times the diameter of the spindle. The valve seat exhibits a diameter which is 0.8-1.1 times the diameter of the spindle. The diffuser is also conical, but having an increasing cross-section in the flow direction, and exhibits and angle of 15-45° with the longitudinal axis of the flow channel, which transfers into an outlet channel having a uniform flow cross-section having a diameter which is about 2.4-4.4 times the diameter of the spindle.

The dimensions above are provided as mutual proportions, to simplify transfer to different dimensions. In the detailed description below, a particularly preferred geometric design of the spindle and the flow channel is set forth. The geometric design of the spindle and the flow channel in the valve in accordance with the present invention, provides a very accurate dynamic flow control of the fluid. The control mechanism per se is not described in further detail here, as it is considered to be within the reach of a person skilled in the art having support from the present description. The optimum angle of the first inlet section, and the curved second inlet section, provides a low angle of attack for particles and droplets entrained by the flowing fluid, and will in this way provide a substantial reduction of erosion at the inlet section. This is discussed and described in further detail in the detailed description below. Moreover, the optimum angle of the diffuser section will provide a substantial optimization of the flow regime having reduced turbulence at the outlet section of the valve. This is also discussed and described in further detail in the detailed description below. Additionally, the valve flow coefficient $C_V$ may be provided by numerous values which are applicable to different production and flow profiles during the valve lifetime.

In order to further decrease erosion, the surface of the components subject to erosion is preferably provided with a wear resistant coating. Examples of suitable coatings are tungsten carbide and polycrystalline diamond. However, a person skilled in the art will in force of his/hers professional knowledge and support in the present description, easily find other materials applicable to this purpose.

DRAWINGS

The present invention is described in further detail by reference to a drawing, which illustrates a schematic cross-section through a part of the valve in accordance with the present invention.

DETAILED DESCRIPTION

Now referring to FIG. 1, a cross-section through a part of a valve according to the invention is shown. The flow direction is from left to right in the FIGURE. The FIGURE illustrates a valve housing 10 having a through flow channel 12. A substantially needle-shaped spindle 11 is arranged movable in the flow channel 12 along the longitudinal axis of the flow channel. Moreover, the flow channel 12 exhibits an inlet 13 comprising a first inlet section 13' having a conical cross-section which decreases in the flow direction, and further, viewed in the flow direction, a second inlet section 13" which is curved. The valve seat is indicated generally by 14 and exhibits a diameter which is a bit larger than the diameter of the spindle. Moreover, the flow channel 12 does, viewed in the flow direction, exhibit a diffuser 15 having a substantially constant flow cross-section. In an open position, the spindle 11 is resting in a retracted position to the left in the FIGURE, and provides an annular flow channel along the spindle 11 and towards a substantially cylindrical flow cross-section at the valve seat 14. In a closed position (not illustrated), the spindle 11 abuts the valve seat 14 and blocks flow.

In accordance with the invention, the inlet 13 exhibits an inlet diameter $D_{IN}$ and comprises a first inlet section 13' which is conical and exhibits an angle $\alpha_1$ with the longitudinal axis of the flow channel 12 of 10-30°, and a second inlet part 13" which is curved and exhibits a radius of curvature $R_2$ within the range of 4.73-6.73 times the diameter $D_N$ of the spindle 11.

Moreover, the valve seat 14 exhibits a diameter $D_{ORI}$ that is 0.8-1.1 times the diameter $D_N$ of the spindle 11, and the diffuser 15 exhibits an angle $\alpha_2$ of 15-45° with the longitudinal axis of the flow channel 12. $D_{FIC}$ indicates an imaginary or fictive diameter of the smallest flow cross-section if the second inlet part 13" was conical or, in other words, a pure continuation of the first flow section 13'. The difference between $D_{FIC}$ and $D_{OUT}$ also defines the angle of attack or the starting point 17 of the transition from the first inlet section 13' to the second inlet section 13". Moreover, the first inlet section 13' is arranged tangentially to the angle of attack 17 of the transition to the second inlet section 13". The less the difference is between $D_{FIC}$ and $D_{OUT}$, the longer the angle of attack 17 of the second inlet section 13" will be located towards the smallest flow cross-section 14. To the contrary, the larger the differences between $D_{FIC}$ and $D_{OUT}$ are, the further away from the smallest flow cross-section 14 the angle of attack 17 of the second inlet section 13" will be located.

The outlet channel 16 exhibits a diameter $D_{OUT}$ of about 2.4-4.4 times the diameter $D_N$ of the spindle 11, and the radius of curvature $R_1$ of the spindle 11 towards the apex is within the range of 4.7-6.7 times the diameter $D_N$ of the spindle 11.

In a particularly preferred embodiment, the angle $\alpha_2$ of the diffuser 15 in the flow channel 16 is substantially 30° with the longitudinal axis of the flow channel 12.

In a particularly preferred embodiment, the angle $\alpha_1$ of the first inlet section 13' is substantially 15° with the longitudinal axis of the flow channel 12.

In a particularly preferred embodiment, the radius of curvature $R_1$ of the spindle 11 and the radius of curvature $R_2$ of the second inlet section 13", both are substantially 5.7 times the diameter $D_N$ of the spindle.

In a particularly preferred embodiment, the valve seat 14 exhibits a length L having a uniform flow cross-section, wherein the length is substantially equal to the diameter $D_N$ of the spindle 11. The length L may alternatively be equal to zero, i.e., the second inlet section 13" transfers directly into the diffuser 15. Alternatively, the length L may be a value between zero and the diameter $D_N$ of the spindle, or even larger than the diameter $D_N$.

The inlet diameter $D_{IN}$ in the flow channel 12 is about 2.08-2.14 times the diameter $D_N$ of the spindle 11, preferably 2.11 times the diameter $D_N$ of the spindle 11.

In a particularly preferred embodiment, the outlet channel 16 exhibits a diameter $D_{OUT}$ which is about 3.4 times the diameter $D_N$ of the spindle 11.

EXAMPLE

Tests were performed on rate of erosion of a valve in accordance with the present invention, having an inlet angle $\alpha_1$ in the inlet section of 15 degrees, having a varying diffuser angle $\alpha_2$ of from 15 to 45 degrees. All tests were performed with the same percentage opening of 25%, and the same accumulated sand content. The tests were performed in a sand injection rig, where the sand was circulated once in a gaseous medium. Mean sand grain diameter was 0.28 mm. The tests were performed in batches of 25 kg sand with a typical injection period of less than 1 hour. The total amount of sand injected was 75 kg. A test with lower radius of curvature of the second inlet section (and the spindle) was also performed. The erosion measurements were performed by a traversing needle in the seat, downstream of the smallest flow cross-section. The results are summarized in the table below.

| Test # | Diffuser angle $\alpha_2$ | Rate of seat erosion (relative) |
|---|---|---|
| 1 | 45 | 1 |
| 2 | 30 | 1.6 |
| 3 | 15 | 3 |
| 4* | 15 | 10 |

*Test number 4 was performed with a smaller radius of curvature in the second inlet section The results show that a diffuser angle, e.g., of 45 and 30 degrees, gave a substantially lower rate of erosion than an angle of 15 degrees. The radius of curvature of the second inlet section also impacts the rate of erosion.

The invention claimed is:

1. Fluid flow control valve, said valve comprising a valve housing (10) provided with a flow channel (12) along a longitudinal axis, which in direction from an inlet section to an outlet section, comprises a conical inlet (13) at the inlet section, a valve seat (14), and a diffuser (15) at the outlet section, which transfers into an outlet flow channel (16) having a uniform flow cross-section, wherein a needle-shaped spindle (11) is arranged axially movable within the flow channel (12) and exhibits a diameter, at the end to be contacted by the valve seat, equal to or larger than the smallest flow cross-section of the valve seat (14), characterized in that:
   a) the inlet (13) exhibits an inlet diameter ($D_{IN}$) and comprises a first inlet section (13') which is conical and exhibits an angle ($\alpha_1$) with the longitudinal axis of the flow channel (12) of 10-30°, and
   a second inlet section (13") which is curved and exhibits a radius of curvature ($R_2$) in the range of 4.7-6.7 times the diameter ($D_N$) of the spindle (11),
   b) the valve seat (14) exhibits a diameter $D_{ORI}$ that is 0.8-1.1 times the diameter ($D_N$) of the spindle (11),
   c) the diffuser (15) is conical having an increasing cross-section in the flow direction, and exhibits an angle ($\alpha_2$) of 15-45° with the longitudinal axis of the flow channel (12), wherein the outlet flow channel (16) exhibits a diameter ($D_{OUT}$) of about 2.4-4.4 times the diameter ($D_N$) of the spindle (11), and d) the radius of curvature ($R_1$) of the spindle (11) towards the apex, is within the range of 4.7-6.7 times the diameter ($D_N$) of the spindle (11).

2. The valve of claim 1, characterized in that the angle ($\alpha_2$) of the diffuser (15) in the flow channel (16) is 30°.

3. The valve of claim 1, characterized in that the angle ($\alpha_1$) of the first inlet section (13') is 15° degrees with the longitudinal axis of the flow channel (12).

4. The valve of claim 1, characterized in that the radius of curvature ($R_1$) of the spindle (11) and the radius of curvature ($R_2$) of the second inlet section (13") both are 5.7 times the diameter ($D_N$) of the spindle.

5. The valve of claim 1, characterized in that the outlet channel (16) exhibits a diameter ($D_{OUT}$) of about 3.4 times the diameter ($D_N$) of the spindle (11).

6. The valve of claim 1, characterized in that the inlet diameter ($D_{IN}$) is 2.08-2.14 times the diameter ($D_N$) of the spindle (11).

7. The valve of claim 6, characterized in that the inlet diameter ($D_{IN}$) is about 2.11 times the diameter ($D_N$) of the spindle (11).

8. The valve of claim 1, characterized in that the surface of the components subject to erosion are provided with a wear resistant coating.

9. The valve of claim 8, characterized in that the wear resistant coating is selected from the group consisting of tungsten carbide and polycrystalline diamond.

10. A fluid flow control valve comprising a valve housing (10) provided with a flow channel (12) along a longitudinal axis, which in direction from an inlet section to an outlet section, comprises a conical inlet (13) at the inlet section, a valve seat (14), and a diffuser (15) at the outlet section, which transfers into an outlet flow channel (16) having a uniform flow cross-section, wherein a needle-shaped spindle (11) is arranged axially movable within the flow channel (12) and exhibits a diameter, at the end to be contacted by the valve seat, equal to or larger than the smallest flow cross-section of the valve seat (14), characterized in that:

a) the inlet (13) exhibits an inlet diameter ($D_{IN}$) and comprises
a first inlet section (13') which is conical and exhibits an angle (ai) with the longitudinal axis of the flow channel (12) of 10-30°, and
a second inlet section (13") which is curved and exhibits a radius of curvature ($R_2$) in the range of 4.7-6.7 times the diameter ($D_N$) of the spindle (11), b) the valve seat (14) exhibits a diameter $D_{ORI}$ that is 0.8-1.1 times the diameter ($D_N$) of the spindle (11), c) the diffuser (15) is conical having an increasing cross-section in the flow direction, and exhibits an angle ($\alpha_2$) of 15-45° with the longitudinal axis of the flow channel (12), wherein the outlet flow channel (16) exhibits a diameter ($D_{OUT}$) of about 2.4-4.4 times the diameter ($D_N$) of the spindle (11), d) the radius of curvature ($R_1$) of the spindle (11) towards the apex, is within the range of 4.7-6.7 times the diameter ($D_N$) of the spindle (11), and e) the needle-shaped spindle (11) moves within the inlet section in a direction of fluid flow to contact the valve seat (14).

* * * * *